Patented Mar. 11, 1952

2,588,978

UNITED STATES PATENT OFFICE 2,588,978

PROCESS OF MANUFACTURING RESORCINOL MONOBENZOATE

William M. Gearhart and Robert W. Pugh, Kingsport, Tenn., assignors to Eastman Kodak Company, Rochester, N. Y., a corporation of New Jersey No Drawing. Application April 30, 1949, Serial No. 90,764

3 Claims. (Cl. 260—476)

This invention relates to a process of making resorcinol monobenzoate, and more particularly to a process of making resorcinol monobenzoate from resorcinol dibenzoate.

In the processes which have been described for making resorcinol monobenzoate, considerable quantities of resorcinol dibenzoate have been formed, the amount of the diester often greatly exceeding the amount of the monoester. We have discovered a process of converting resorcinol dibenzoate into resorcinol monobenzoate, with good yields of pure monoester.

Our novel process consists in heating resorcinol dibenzoate with resorcinol in the presence of a small amount of an alkaline catalyst, in an atmosphere of a non-oxidizing gas. No solvent is used, and no objectionable by-products are formed. The product is easily purified.

In our process, varying proportions of resorcinol and resorcinol dibenzoate, with resorcinol in from 0–100% excess, are melted together in a reactor, and heated to a few degrees above 100° C. for a time to drive off any moisture. An atmosphere of an inert gas is provided during the entire heating and reaction, to prevent coloration by oxidation. A small amount of catalyst is added to the molten, stirred mass, and the reaction is carried on at a temperature of from 80° C. to 150° C., for from one-half hour to twenty-four hours. When sodium methoxide is used as the catalyst, the time need not be greater than four hours and the temperature need not be greater than 110° C. At 105° C., two hours appears to be the optimum time, although very good yields are obtained at one hour. The melt is quenched with water with vigorous stirring to dissolve excess resorcinol, and the solid remaining, a mixture of resorcinol mono- and di-benzoates, is treated with a hot, aliphatic monohydric alcohol of less than four carbon atoms. Cooling the alcohol solution deposits resorcinol dibenzoate. This is filtered off and washed, and the combined filtrate and washings, on dilution with ice water, yield a light, granular solid, the crude monobenzoate. Distillation and/or recrystallization of this crude material gives the pure resorcinol monobenzoate.

The following example serves to illustrate our novel process.

Example.—A mixture of 64 g. of resorcinol dibenzoate and 28 g. of resorcinol (about 25% excess) was melted in a 500 ml. flask fitted with stirrer, thermometer, and nitrogen inlet. A slow stream of nitrogen gas was passed through as soon as the material was largely liquid, and continued throughout the reaction. The temperature of the mass was held at 110° C. for ten minutes to remove any moisture. 0.5 g. of sodium methoxide was added, and the temperature maintained at 105° C. for two hours. The melt was poured into 200 ml. of warm water, and manual stirring was applied until the gummy mass had solidified to granules. These were filtered off, washed with water, and dissolved in 200 ml. of hot ethanol. The alcohol solution, on being cooled rather rapidly to room temperature, deposited crystals of resorcinol dibenzoate. These were filtered off, washed with a little cool, fresh ethanol, and dried for recycling. The filtrate was poured into 1 liter of ice water, and the resulting granular solid was filtered off, washed with water, and dried. It weighed 58 g. (a 68% yield), and melted at 133° C.

Any inert, non-oxidizing gas, such, for instance, as carbon dioxide, may be used in place of nitrogen. The catalyst may be chosen from the alkali and alkaline earth metals and many of their compounds, both organic and inorganic. We have obtained good yields with a sodium-magnesium alloy, and with sodium oxide. However, the use of sodium methoxide permits of running the reaction at a lower temperature, which decreases the tendency toward formation of a colored impurity, and also practically eliminates loss of resorcinol by sublimation. We have found that methanol, or isopropanol (88%), may be used instead of ethanol as the recrystallization medium in the separation of the mono- and diesters.

Technical grade resorcinol may be used in our process, in place of pure resorcinol, without diminishing the yield. However, the use of crude resorcinol dibenzoate in place of recrystallized resorcinol dibenzoate had an adverse effect on the yield.

What we claim as our invention and desire to be secured by Letters Patent of the United States is:

1. A process of preparing resorcinol monobenzoate which comprises heating resorcinol dibenzoate with approximately 25% excess of resorcinol, in an atmosphere of a non-oxidizing gas, in the presence of a small amount of sodium methoxide, at a temperature of from 80° C. to 110° C., for from ½ hour to 4 hours, dissolving out unreacted resorcinol with water, and separating unreacted resorcinol dibenzoate from the resorcinol monobenzoate formed, by means of their differential solubility in a hot, aliphatic monohydric alcohol of less than 4 carbon atoms.

2. A process of preparing resorcinol monobenzoate which comprises heating resorcinol dibenzoate with approximately 25% excess of resorcinol, in an atmosphere of a non-oxidizing gas selected from the group consisting of nitrogen and carbon dioxide, in the presence of a small amount of sodium methoxide, at a temperature of from 80° C. to 110° C., for from 1 to 2 hours, dissolving out unreacted resorcinol with water, and separating unreacted resorcinol dibenzoate from the resorcinol monobenzoate formed, by means of their differential solubility in a hot, aliphatic monohydric alcohol of less than 4 carbon atoms.

3. A process of preparing resorcinol monobenzoate which comprises heating resorcinol dibenzoate with approximately 25% excess of resorcinol, in an atmosphere of nitrogen, in the presence of a small amount of sodium methoxide, at a temperature of approximately 105° C., for approximately 2 hours, dissolving out unreacted resorcinol with water, and separating unreacted resorcinol dibenzoate from the resorcinol monobenzoate formed, by means of their differential solubility in a hot, aliphatic monohydric alcohol of less than 4 carbon atoms.

WILLIAM M. GEARHART.
ROBERT W. PUGH.

REFERENCES CITED

The following references are of record in the file of this patent:

UNITED STATES PATENTS

| Number | Name | Date |
|---|---|---|
| 2,345,006 | Ross et al. | Mar. 28, 1944 |

FOREIGN PATENTS

| Number | Country | Date |
|---|---|---|
| 122,145 | Germany | July 5, 1901 |
| 281,009 | Germany | Dec. 14, 1914 |

OTHER REFERENCES

Kauffman et al.: Ber., vol. 44, p. 754 (1911).
Fischer: Ber., vol. 53, p. 1639 (1920).